United States Patent
Li et al.

(10) Patent No.: US 12,118,351 B2
(45) Date of Patent: Oct. 15, 2024

(54) AUTOMATIC CAPTURE OF USER INTERFACE SCREENSHOTS FOR SOFTWARE PRODUCT DOCUMENTATION

(71) Applicant: International Business Machines Corporation, Armonk, NY (US)

(72) Inventors: Shi Kun Li, Shanghai (CN); Jun Qian Zhou, Shanghai (CN); Dan Zhang, Shanghai (CN); Xiao Feng Ji, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 17/394,468

(22) Filed: Aug. 5, 2021

(65) Prior Publication Data

US 2023/0040767 A1    Feb. 9, 2023

(51) Int. Cl.
*G06F 8/73*       (2018.01)
*G06F 18/2323*    (2023.01)
*G06F 18/2431*    (2023.01)

(52) U.S. Cl.
CPC ............ *G06F 8/73* (2013.01); *G06F 18/2323* (2023.01); *G06F 18/2431* (2023.01)

(58) Field of Classification Search
CPC ................................. G06F 8/73; G06F 18/2323
See application file for complete search history.

(56) References Cited

U.S. PATENT DOCUMENTS

| | | | |
|---|---|---|---|
| 8,793,578 B2 | 7/2014 | Mounty et al. | |
| 9,600,519 B2 | 3/2017 | Schöning et al. | |
| 9,940,314 B2 | 4/2018 | Feltham et al. | |
| 2014/0019937 A1* | 1/2014 | Clark | G06F 8/73 717/123 |
| 2014/0181705 A1* | 6/2014 | Hey | G06F 3/048 715/764 |
| 2015/0081598 A1 | 3/2015 | Depizzol et al. | |
| 2016/0011755 A1* | 1/2016 | Douek | G06F 9/455 715/704 |
| 2018/0121747 A1* | 5/2018 | Kogan | G06F 11/3672 |

(Continued)

OTHER PUBLICATIONS

Wei Jin et al., Node Similarity Preserving Graph Convolutional Networks, Mar. 2021 [retrieved on Aug. 12, 2023], pp. 1-9, downloaded from <url>:https://arxiv.org/abs/2011.09643. (Year: 2021).*

(Continued)

*Primary Examiner* — S. Sough
*Assistant Examiner* — Stephen D Berman
(74) *Attorney, Agent, or Firm* — CANTOR COLBURN LLP; Teddi Maranzano (57) ABSTRACT

Embodiments of the invention are directed to automatically capturing user interface screenshots for use in documentation of a software product. Aspects include identifying a user interface window of the software product and creating a degree-of-completion graph for the user interface window. Aspects also include capturing a plurality of screenshots of the user interface window during use of the software product and calculating a degree-of-completion percentage for each of the plurality of screenshots. Aspects further include identifying a subset of the plurality of screenshots to be included in the software product documentation based on the degree-of-completion percentage.

16 Claims, 7 Drawing Sheets

(56) References Cited

U.S. PATENT DOCUMENTS

2019/0042662 A1\* 2/2019 Cohen ................. G06F 16/9024
2020/0125481 A1\* 4/2020 Walber ................ G06F 11/3676
2021/0303533 A1\* 9/2021 Legler ................. G06F 16/2246
2021/0406040 A1\* 12/2021 Kuduvalli ............... G06F 9/451

OTHER PUBLICATIONS

Rodrigo Souza et al., "GuideAutomator: Continuous Delivery of End User Documentation," 2017 [retrieved on Aug. 10, 2024], IEEE/ACM 39th International Conference on Software Engineering: New Ideas and Emerging Technologies Results Track, pp. 31-34, downloaded from <url>:https://ieeexplore.ieee.org. (Year: 2017).\*

Anonymous, "A method to auto detect screenshots changes and update to the latest version." IPCOM000262283D, May 17, 2020. 3 Pages.

Anonymous, "Automatic process for generating screen captures and the corresponding documentation for all GUI elements contained within an application." IPCOM000226370D, Mar. 30, 2013. pp. 7.

\* cited by examiner

AUTOMATIC CAPTURE OF USER INTERFACE SCREENSHOTS FOR SOFTWARE PRODUCT DOCUMENTATION

BACKGROUND

The present invention generally relates to capturing user interface screenshots, and more specifically, to automatically capturing user interface screenshots for use in software product documentation.

Software product documentation, such as user guides and the like often includes screenshots of the user interface (UI) of the software product. Including UI screenshots allow users to better follow the instructions step-by-step and to verify their operations by comparing the UI they are experiencing with the UI screenshots. In addition, including UI screenshots in the product documentation allow users to learn about the software product via the UI captures without installing or accessing the product. Accordingly, technical writers that prepare the software documentation are aware that UI captures are important elements for easy-to-use product documentation and add illustrative UI captures accordingly.

Often, the time required to manually capture UI screenshots for product documents (such as user guides) is very high. Currently available software allows a user to automatically capture screenshots periodically, such as every two or five seconds, or when a UI event occurs (e.g. a new active window showing up or a UI control being activated). However, this type of automatic capture software often results in too many screenshots being captured and requires the technical writers to sort through the captured screenshots to identify the desired screenshots.

SUMMARY

Embodiments of the present invention are directed to a computer-implemented method for automatically capturing user interface (UI) screenshots for use in software product documentation. A non-limiting example of the computer-implemented method includes identifying a user interface window of the software product and creating a degree-of-completion graph for the user interface window. The method also includes capturing a plurality of screenshots of the user interface window during use of the software product and calculating a degree-of-completion percentage for each of the plurality of screenshots. The method further includes identifying a subset of the plurality of screenshots to be included in the software product documentation based on the degree-of-completion percentage.

Embodiments of the present invention are directed to a system for automatically capturing user interface (UI) screenshots for use in software product documentation. A non-limiting example of the system includes a processor communicative coupled to a memory, the processor operable to identify a user interface window of the software product and create a degree-of-completion graph for the user interface window. The processor also operable to capture a plurality of screenshots of the user interface window during use of the software product and calculate a degree-of-completion percentage for each of the plurality of screenshots. The processor further operable to identify a subset of the plurality of screenshots to be included in the software product documentation based on the degree-of-completion percentage.

Embodiments of the invention are directed to a computer program product for automatically capturing user interface (UI) screenshots for use in software product documentation, the computer program product comprising a computer readable storage medium having program instructions embodied therewith. The program instructions are executable by a processor to cause the processor to perform a method. A non-limiting example of the method includes identifying a user interface window of the software product and creating a degree-of-completion graph for the user interface window. The method also includes capturing a plurality of screenshots of the user interface window during use of the software product and calculating a degree-of-completion percentage for each of the plurality of screenshots. The method further includes identifying a subset of the plurality of screenshots to be included in the software product documentation based on the degree-of-completion percentage.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
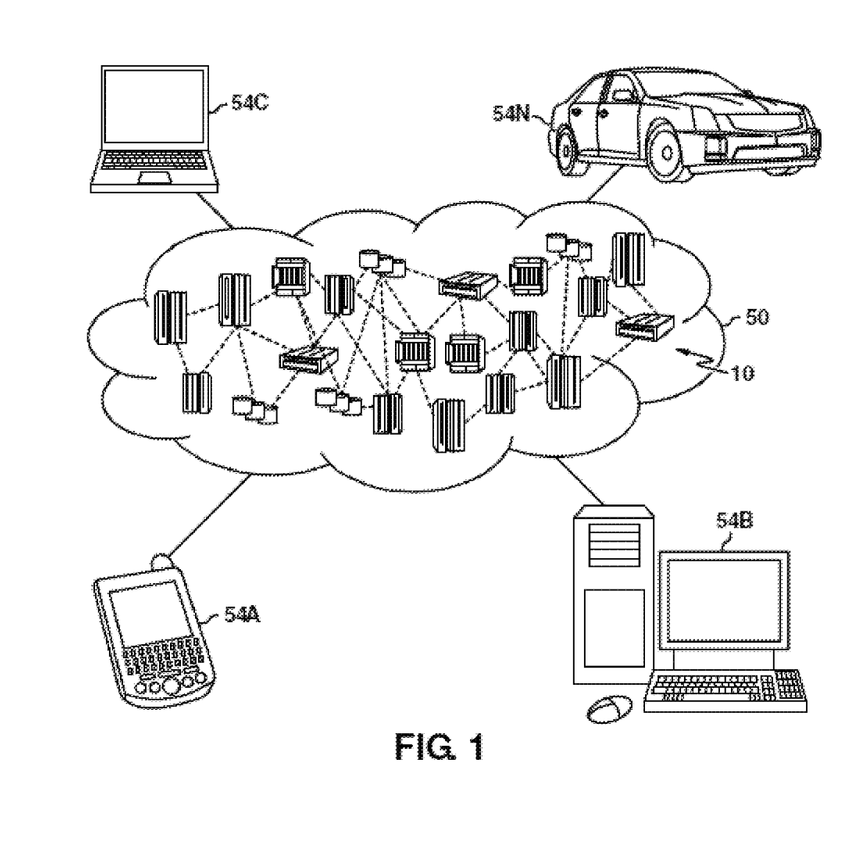
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
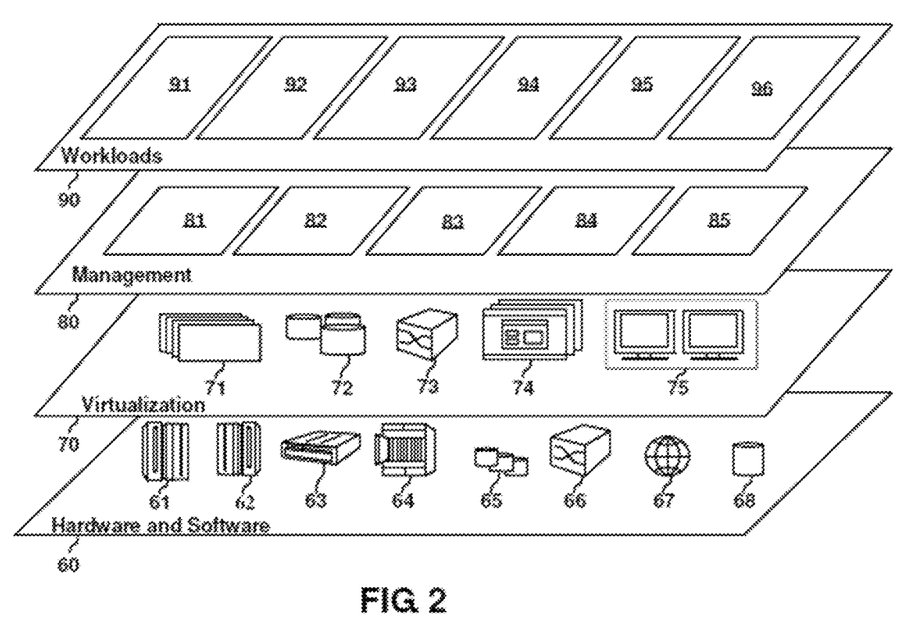
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and capturing user interface screenshots for product documentation 96.

Figure 3:
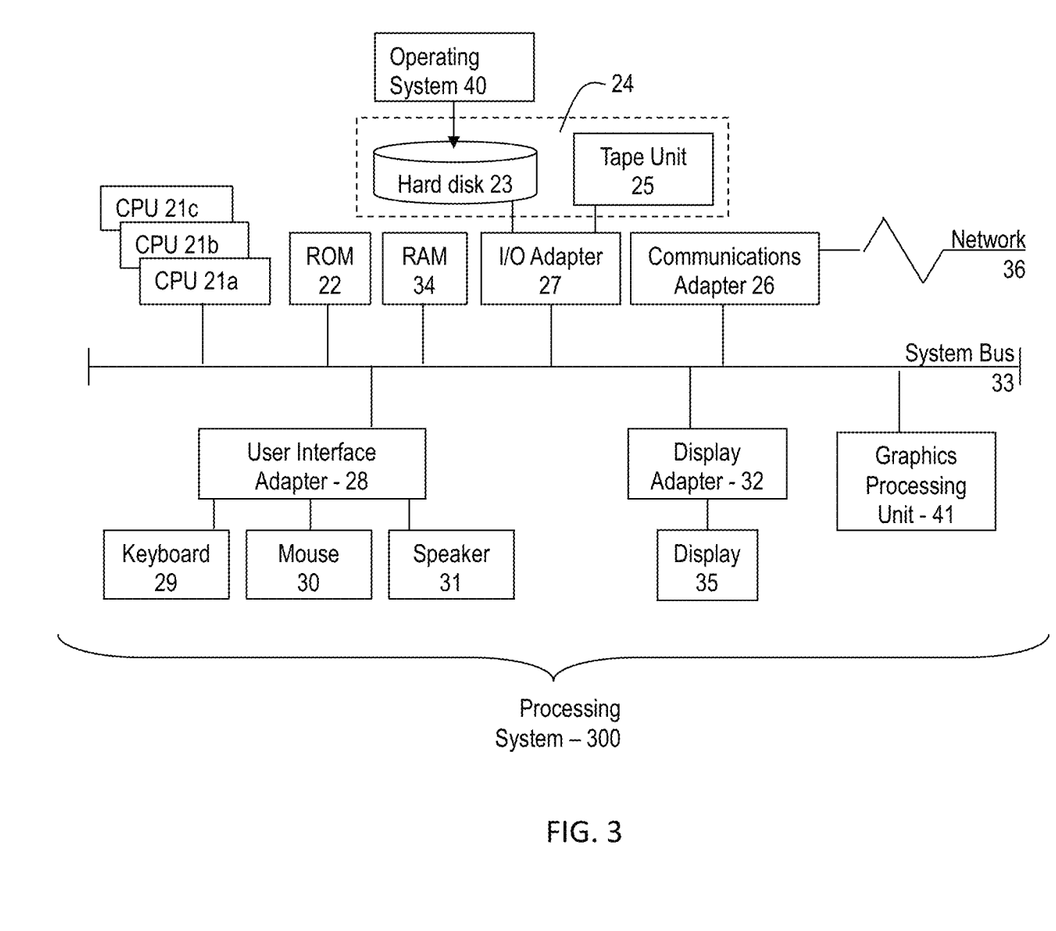
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system to coordinate the functions of the various components shown in FIG. 3.

Turning now to an overview of technologies that are more specifically relevant to aspects of the invention, methods, systems, and computer program products for automatically capturing user interface (UI) screenshots for use in software product documentation are provided. In exemplary embodiments, the methods, systems, and computer program products are configured to automatically capture and identify screenshots for inclusion in product documentation based on a calculated degree of completion of UI windows depicted in screenshots. In exemplary embodiments, the degree of completion of a UI window is calculated based on a degree-of-completion graph, which is an undirected and weighted topological graph created based on the characteristics of the UI window. In exemplary embodiments, the degree-of-completion graph is constructed in the backend to obtain the status of the UI controls. As used herein, the characteristics of the UI window refer to the status of whether a UI control of the UI window has user input. Once created, the degree-of-completion graph is analyzed using a Graph Convolutional Network (GCN) to obtain the degree of completion and degree-of-completion percentage of the UI window depicted in a screenshot. In exemplary embodiments, the methods, systems, and computer program products are also configured to obtain a historical collection of degrees of completion and degree-of-completion percentages of all UI window categories using machine learning from available systems and their related user guides.

Figure 4:
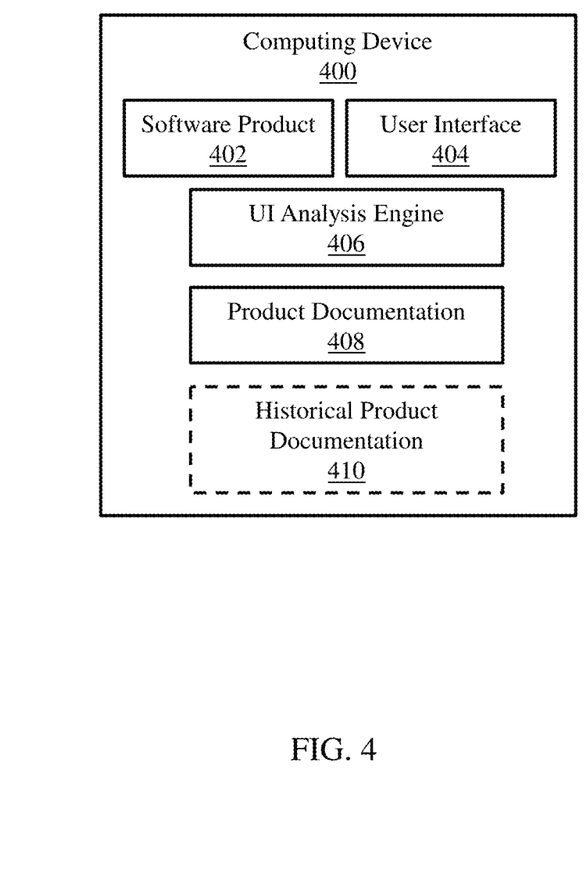
FIG. 4 depicts a system for automatically capturing user interface (UI) screenshots for use in software product documentation according to embodiments of the invention.

Turning now to a more detailed description of aspects of the present invention, FIG. 4 depicts a computing system 400 for automatically capturing user interface (UI) screenshots for use in software product documentation according to embodiments of the invention. The system 400 includes a software product 402, a user interface 404, a UI analysis engine 406, product documentation 408, and optionally historical product documentation 410. The computing system 400 can be implemented on the processing system 300 found in FIG. 3. Additionally, the cloud computing system 50 can be in wired or wireless electronic communication with one or all of the elements of the computing system 400. Cloud 50 can supplement, support, or replace some or all of the functionality of the elements of the computing system 400. Additionally, some or all of the functionality of the elements of computing system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

As discussed herein, a degree of completion in a UI window is a measure that indicates the degree of completion of user operations (e.g. click a button, input value, or select a date) in a UI window. In exemplary embodiments, each degree of completion has nothing to do with the sequence of execution steps, but with what operations have been done, which are closely related to the input values (or states) of UI controls within a window. For example, the input status of a typical UI control in a window like a user ID field causes two different degrees of completion: one is with the user ID input, and the other is without the user ID input.

Figure 5A:
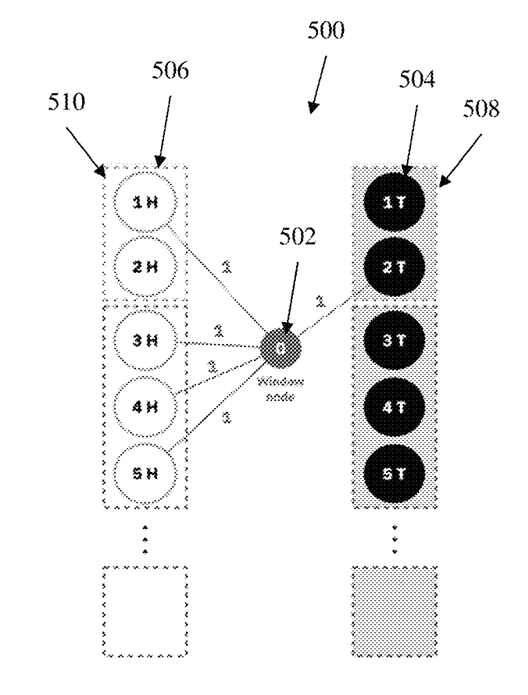
FIG. 5A depicts a degree-of-completion graph according to one or more embodiments of the invention.

In exemplary embodiments, a degree-of-completion graph is used to calculate the degree of completion of user operations in a UI window. FIG. 5A illustrates a schematic diagram of a degree of completion 500 in accordance with an embodiment. The degree-of-completion graph 500 is an undirected and weighted topological graph that is build based on the characteristics of the UI window. In exemplary embodiments, the degree-of-completion graph 500 is created starting with a window node 502, which a node index that is equal to zero, which is used to represent the UI window. Next, each UI control in the UI window is assigned with a unique index starting from one. Each UI control corresponds to two nodes in the degree-of-completion graph 500. One of the nodes is an input-free node 504 and another is an input node 506. In exemplary embodiments, the input-free nodes 504 and the input nodes 506 are placed into corresponding category groups 508, 510 which are used to group input or input-free nodes of the same control type and the same value type. In one embodiment, N is the total number of UI control categories in the software world, not the number of UI control categories in the particular UI window. In exemplary embodiments, if a UI element has an input value, then there will be a connecting edge between its input node 506 and the window node 502. If a UI element does not have an input value, then there will be a connecting edge between its input-free node 504 and the window node 502. In exemplary embodiments, the weights of connecting edges are always set to be one.

Figure 5B:
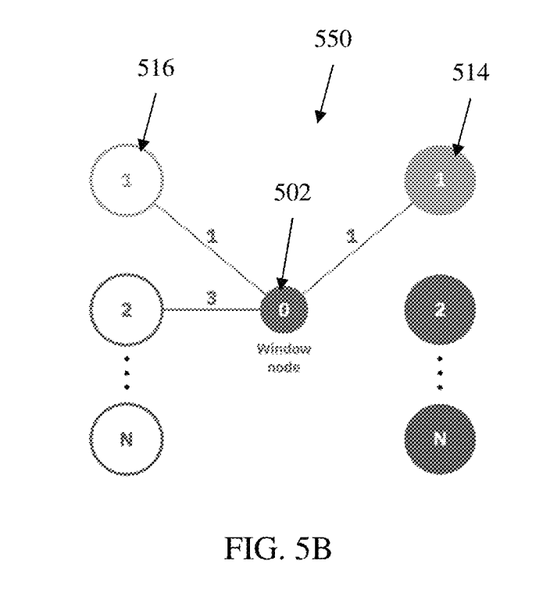
FIG. 5B depicts a compressed degree-of-completion graph according to one or more embodiments of the invention.

In exemplary embodiments, once the degree-of-completion graph 500 has been created, the degree-of-completion graph 500 is compressed to create a compressed degree-of-completion graph 550. Compressing the degree-of-completion graph 500 simplifies its structure and reduces the number of calculations required to analyze the degree-of-completion graph 500. In exemplary embodiments, the input-free nodes 504 from each input-free category group 508 are compressed into a virtual input-free node 514 and the weight of the connection between the virtual input-free node 514 and the window node 502 is the sum of the connecting edges between the input-free nodes 504 from each input-free category group 508 and the window node 502. If there are no input-free nodes 504 in an input-free category group 508, there will be no connecting edges between the virtual input-free node 514 and the window node 502. Similarly, the input nodes 506 from each input-category group 510 are compressed into a virtual input node 516 and the weight of the connection between the virtual input node 516 and the window node 502 is the sum of the connecting edges between the input nodes 506 from each input-category group 510 and the window node 502. If there are no input nodes 506 in an input-category group 510, there will be no connecting edges between the virtual input node 516 and the window node 502.

In exemplary embodiments, after the degree-of-completion graph for a UI window has been created and compressed, the degree-of-completion graph is analyzed to identify a degree-of-completion and/or a degree-of-completion percentage of a screenshot of the UI window. In exemplary embodiments, in order to calculate a degree-of-completion, the compressed degree-of-completion graph is fed into a three-layer Graph Convolutional Network (GCN) as an input. After features of the compressed degree-of-completion graph are extracted, the output of GCN contains the node embedding of the window node, which is considered as the value of the degree of completion.

In exemplary embodiments, the node embedding of a node in a topological graph is calculated using a three-layer GCN as an input using the 1-layer GCN formula, $H^{(l+1)} = \sigma(\tilde{D}^{-1/2}\tilde{A}\tilde{D}^{-1/2}H^{(l)}W^{(l)})$ where $\tilde{A} = A + I$ and $\tilde{D}_{ii} = \Sigma_j \tilde{A}_{ij}$. In addition, A is a weighted adjacency matrix, I is an identity matrix, $\tilde{D}$ is the diagonal node degree matrix of $\tilde{A}$, feature matrix X is an identity matrix, each parameter matrix W is randomly initialized, and $\sigma(\cdot)$ is the non-linear activation function ReLU.

In exemplary embodiments, the degree-of-completion percentage is calculated as: Degree_of_completion_percentage=2−cos(window_node_embedding_1, window_node_embedding_2))/(2−cos(window_node_embedding_3, window_node_embedding_2))*100, where window_node_embedding_1 is the node embedding of window node in the current degree-of-completion graph, window_node_embedding_2 is the node embedding of window node in the degree-of-completion graph which input-free nodes belonging to all UI controls connect to the window node, and window_node_embedding_3 is the node embedding of window node in the degree-of-completion graph which input nodes belonging to all UI controls connect to the window node.

Figure 6:
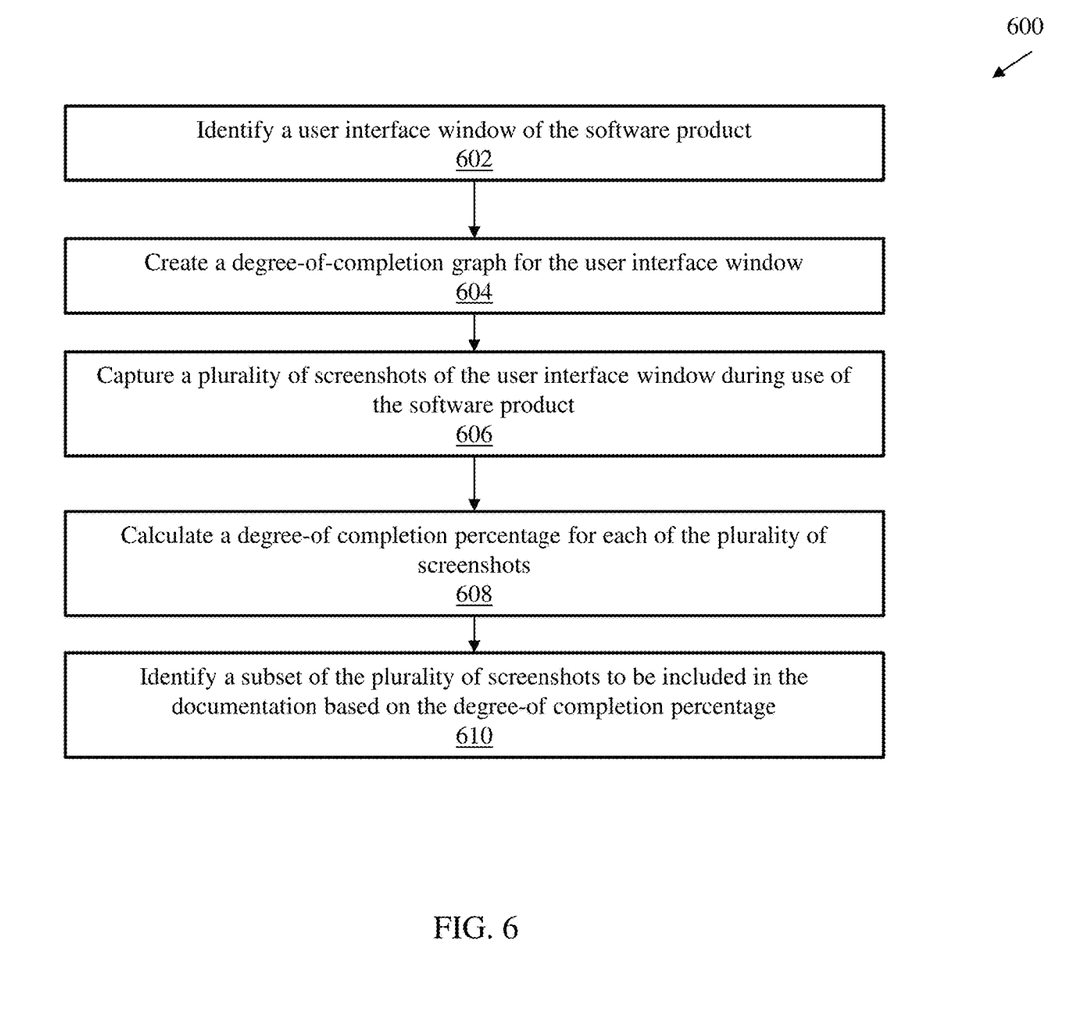
FIG. 6 depicts a flow diagram of a method for automatically capturing user interface (UI) screenshots for use in software product documentation according to one or more embodiments of the invention.

FIG. 6 depicts a flow diagram of a method 600 for automatically capturing user interface (UI) screenshots for use in software product documentation according to one or more embodiments of the invention. The method 600 includes identifying a user interface window of the software product, as shown at block 602. Next, as shown at block 604, the method 600 includes creating a degree-of-completion graph for the user interface window. In exemplary embodiments, the degree-of-completion graph is an undirected and weighted graph that is created by identifying whether UI controls have input and grouping UI controls of the user interface window. The method 600 also includes capturing a plurality of screenshots of the user interface window during the use of the software product, as shown at block 606. In one embodiment, capturing the plurality of screenshots of the user interface window during use of the software product includes capturing screenshots on a periodic basis while the user interface window is open. In another embodiment, capturing the plurality of screenshots of the user interface window during use of the software product includes capturing screenshots each time a user interface event occurs for the user interface window.

Next, as shown at block 608, the method 600 includes calculating a degree-of-completion percentage for each of the plurality of screenshots. In exemplary embodiments, calculating the degree-of-completion percentage for each of the plurality of screenshots includes analyzing the degree-of-completion graph that corresponds to each of the plurality of screenshots. In one embodiment, analyzing the degree-of-completion graph includes inputting the degree-of-completion graph into a three-layer graph convolutional network, wherein the degree-of-completion percentage is calculated via window_node_embedding_1, window_node_embedding_2, and window_node_embedding_3 of the corresponding degree-of-completion graphs. The method 600 further includes identifying a subset of the plurality of screenshots to be included in the documentation based on the degree-of-completion percentage, as shown at block 610. In exemplary embodiments, the method also includes automatically inserting the subset of the plurality of screenshots into the software product documentation.

In one embodiment, the method also includes obtaining documentation of a prior version of the software product and identifying screenshots included in the documentation. Once the screenshots are identified, each of the screenshots is classified into a user interface window category. Then, when the newer version of the software product is being used, a user interface window category for a new user interface window is determined. Next, a degree-of-completion percentage is calculated for each of the identified screenshots that belong to the same user interface window category as the new user interface window. The identified screenshot in the product documentation can then be replaced with a screenshot of the new user interface window that has the closest degree-of-completion percentage to the identified screenshot.

In exemplary embodiments, UI windows in software can be classified into a limited number of UI window categories and UI windows of each category function for the same purpose, e.g., completing the same business tasks, the required UI operations and control values in those windows should be similar in order to serve that purpose. Accordingly, available historical product documentation containing screenshots of all UI window categories can be analyzed to determine which screenshots under what degrees of completion for each UI window category experienced technical writers would traditionally choose to capture and include in the product documentation. As a result, a machine learning model can be trained and used to obtain a collection of screenshots for every UI window category. Accordingly, by analyzing historical product documentation to obtain a historical collection of degrees of completion and degree-of-completion percentages of all UI window categories, the process of automatic identification and classification of screenshots for new versions of user guides can be performed much more efficiently.

Figure 7:
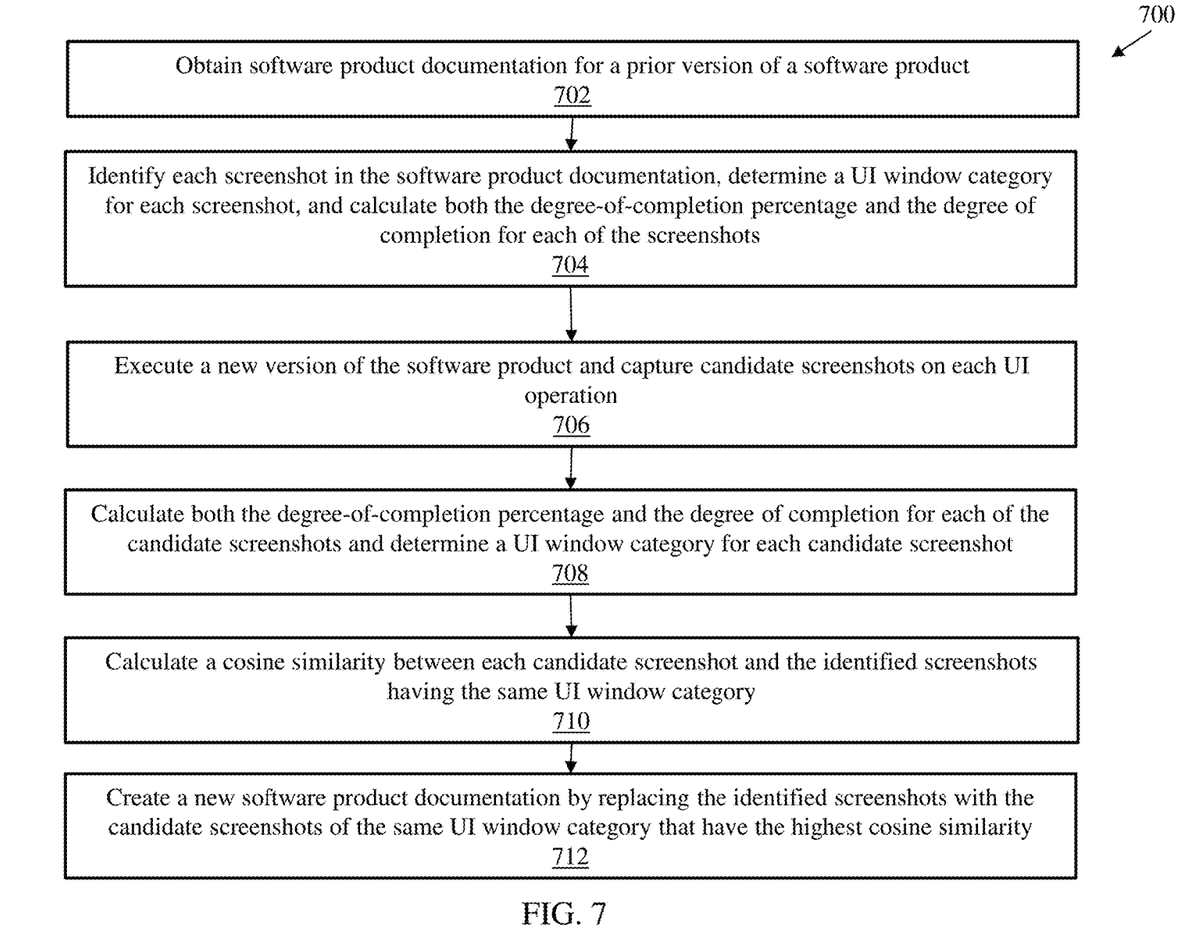
FIG. 7 depicts a flow diagram of a method for updating software product documentation by automatically capturing user interface (UI) screenshots according to one or more embodiments of the invention.

Referring now to FIG. 7, a flow diagram of a method 700 for updating software product documentation by automatically capturing user interface (UI) screenshots according to one or more embodiments of the invention is shown. The method 700 includes obtaining software product documentation for a prior version of a software product, as shown at block 702. Next, as shown at block 704, the method 700 includes identifying each screenshot in the software product documentation, determining a UI window category for each screenshot, and calculating both the degree-of-completion percentage and the degree of completion for each of the screenshots. The method 700 also includes executing a new version of the software product and capturing candidate screenshots on each UI operation, as shown at block 706. In exemplary embodiments, candidate screenshots are automatically taken when an active UI window has a degree-of-completion percentage that is within a predetermined range, such as within 2%, of an identified current target degree-of-completion percentage. The identified current target degree-of-completion percentage being obtained from the screenshots of the same UI category in the software product documentation for the prior version of the software product.

Next, as shown at block 708, the method 700 includes calculating both the degree-of-completion percentage and the degree of completion for each of the candidate screenshots and determine a UI window category for each candidate screenshot. The method 700 further includes calculating a cosine similarity between the degree of completion of each candidate screenshot and the identified screenshots having the same UI window category, as shown at block 710. The method 700 concludes at block 712 by creating a new software product documentation by replacing the identified screenshots with the candidate screenshots of the same UI window category that has the highest cosine similarity. In exemplary embodiments, the cosine similarity is calculated by degree of completion. In another embodiment, if cosine similarity is not used, the identified screenshots are replaced with the candidate screenshots of the same UI window category that has the highest degree-of-completion percentage.

Additional processes may also be included. It should be understood that the processes depicted in FIGS. 6 and 7 represent illustrations and that other processes may be added, or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for automatically capturing user interface screenshots for use in documentation of a software product, the method comprising:
    identifying a user interface window of the software product;
    creating a first degree-of-completion graph for the user interface window, wherein the first degree-of-completion graph includes two nodes representing each user interface control of the user interface window;
    capturing a plurality of screenshots of the user interface window during use of the software product;
    calculating a degree-of-completion percentage for each of the plurality of screenshots, wherein the degree-of-completion percentage for each of the plurality of screenshots is calculated by inputting the first degree-of-completion graph into a three-layer graph convolutional network, wherein the degree-of-completion percentage calculated for each of the plurality of screenshots is based on embeddings representing a current degree-of- completion graph, a second degree-of-completion graph having each input-free node connected to a window node, and a third degree-of-completion graph having each input node belonging to all user interface controls connected to the window node; and
    identifying a subset of the plurality of screenshots to be included in the documentation of the software product based on the degree-of-completion percentage calculated for each of the plurality of screenshots.

2. The method of claim 1, wherein the first degree-of-completion graph is an undirected and weighted graph that is created by identifying and grouping user interface elements of the user interface window.

3. The method of claim 1, wherein the capturing of the plurality of screenshots of the user interface window during the use of the software product includes capturing screenshots on a periodic basis while the user interface window is open.

4. The method of claim 1, wherein the capturing of the plurality of screenshots of the user interface window during the use of the software product includes capturing screenshots each time a user interface event occurs for the user interface window.

5. The method of claim 1, further comprising:
    obtaining documentation of a prior version of the software product and identifying prior screenshots included in the documentation of the prior version;
    classifying each of the identified prior screenshots as belonging to a user interface window category;
    determining a particular user interface window category for the user interface window; and
    calculating a degree-of-completion percentage for each of the identified prior screenshots that belong to the particular user interface window category.

6. The method of claim 5, wherein the subset of the plurality of screenshots to be included in the documentation includes a plurality of screenshots that have a highest cosine similarity.

7. A system comprising:
    a processor communicatively coupled to a memory, the processor configured to:
    identify a user interface window of a software product;
    create a first degree-of-completion graph for the user interface window, wherein the first degree-of-completion graph includes two nodes representing each user interface control of the user interface window;
    capture a plurality of screenshots of the user interface window during use of a software product;
    calculate a degree-of-completion percentage for each of the plurality of screenshots, wherein the degree-of-completion percentage for each of the plurality of screenshots is calculated by inputting the first degree-of-completion graph into a three-layer graph convolutional network, wherein the degree-of-completion percentage calculated for each of the plurality of screenshots is based on embeddings representing a current degree-of-completion graph, a second degree-of-completion graph having each input-free node connected to a window node, and a third degree-of-completion graph having each input node belonging to all user interface controls connected to the window node; and
    identify a subset of the plurality of screenshots to be included in documentation of the software product based on the degree-of-completion percentage calculated for each of the plurality of screenshots.

8. The system of claim 7, wherein the first degree-of-completion graph is an undirected and weighted graph that is created by identifying and grouping user interface elements of the user interface window.

9. The system of claim 7, wherein the capturing of the plurality of screenshots of the user interface window during the use of the software product includes capturing screenshots on a periodic basis while the user interface window is open.

10. The system of claim 7, wherein the capturing of the plurality of screenshots of the user interface window during the use of the software product includes capturing screenshots each time a user interface event occurs for the user interface window.

11. The system of claim 7, wherein the processor is further configured to:
    obtain documentation of a prior version of the software product and identifying prior screenshots included in the documentation of the prior version;
    classify each of the identified prior screenshots as belonging to a user interface window category;
    determine a particular user interface window category for the user interface window; and
    calculate a degree-of-completion percentage for each of the identified screenshots that belong to the particular user interface window category.

12. A computer program product for automatically capturing user interface screenshots for use in software product documentation comprising a computer readable storage medium having program instructions embodied therewith, the program instructions executable by a processor to cause the processor to perform a method comprising:
    identifying a user interface window of a software product;
    creating a first degree-of-completion graph for the user interface window, wherein the first degree-of-completion graph includes two nodes representing each user interface control of the user interface window;
    capturing a plurality of screenshots of the user interface window during use of the software product;
    calculating a degree-of-completion percentage for each of the plurality of screenshots, wherein the degree-of-completion percentage for each of the plurality of screenshots is calculated by inputting the first degreeof-completion graph into a three-layer graph convolutional network, wherein the degree-of-completion percentage calculated for each of the plurality of screenshots is based on embeddings representing a current degree-of-completion graph, a second degree-of-completion graph having each input-free node connected to a window node, and a third degree-of-completion graph having each input node belonging to all user interface controls connected to the window node; and identifying a subset of the plurality of screenshots to be included in the software product documentation based on the degree-of-completion percentage calculated for each of the plurality of screenshots.

13. The computer program product of claim 12, wherein the first degree-of-completion graph is an undirected and weighted graph that is created by identifying and grouping user interface elements of the user interface window.

14. The computer program product of claim 12, wherein the calculating of the degree-of-completion percentage for each of the plurality of screenshots includes analyzing the first degree-of-completion graph calculated for each of the plurality of screenshots.

15. The computer program product of claim 12, wherein the capturing of the plurality of screenshots of the user interface window during the use of the software product includes capturing screenshots on a periodic basis while the user interface window is open.

16. The computer program product of claim 12, wherein the method further comprises:

obtaining documentation of a prior version of the software product and identifying prior screenshots included in the documentation of the prior version;

classifying each of the identified prior screenshots as belonging to a user interface window category;

determining a particular user interface window category for the user interface window; and calculating a degree-of-completion percentage for each of the identified prior screenshots that belong to the particular user interface window category.

* * * * *